Oct. 6, 1931.  G. A. MOORE  1,826,628
DISK SPRING COMMUTATOR
Filed Aug. 10, 1929
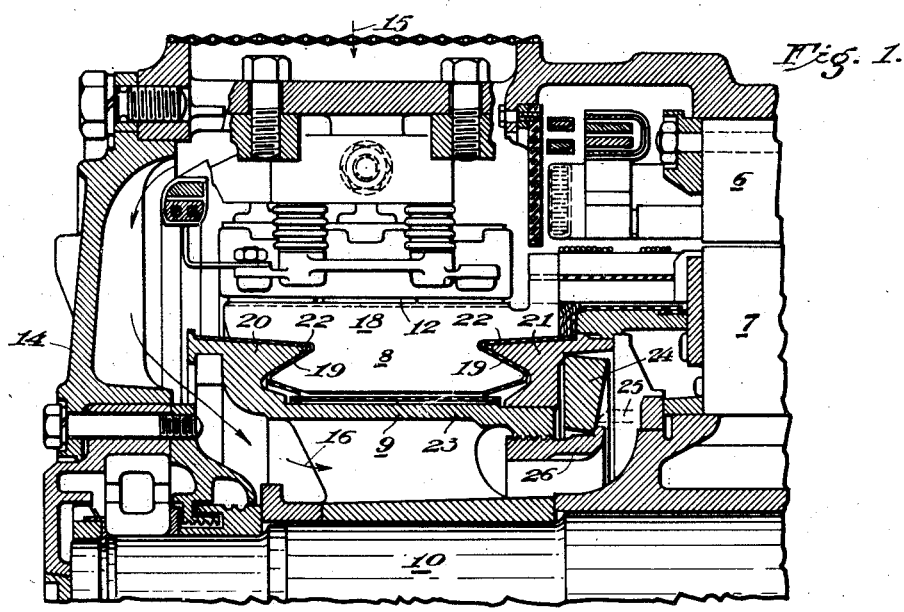
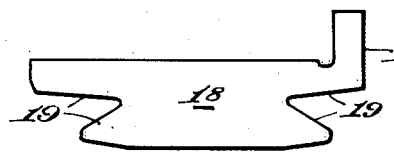
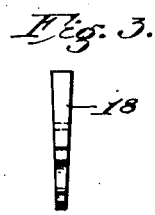
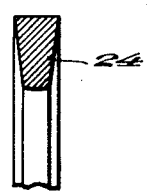
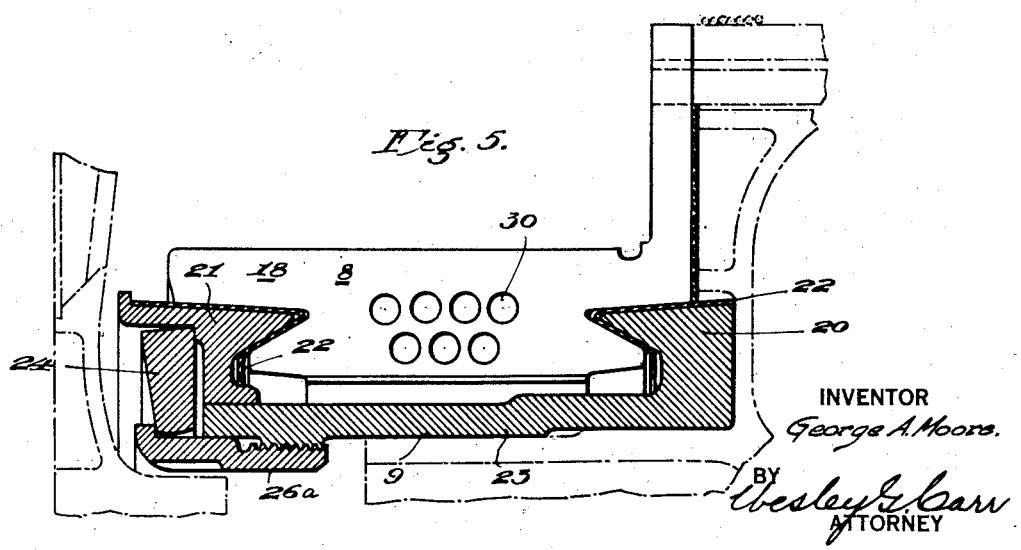
INVENTOR
George A. Moore.
BY
Wesley G. Carr
ATTORNEY Patented Oct. 6, 1931

1,826,628

UNITED STATES PATENT OFFICE

GEORGE A. MOORE, OF WILKINSBURG, PENNSYLVANIA, ASSIGNOR TO WESTINGHOUSE ELECTRIC & MANUFACTURING COMPANY, A CORPORATION OF PENNSYLVANIA

DISK-SPRING COMMUTATOR

Application filed August 10, 1929. Serial No. 384,947.

My invention relates to the mechanical construction of commutator cylinders for dynamo-electric machines, and it has more particular relation to the proper use of spring tightening means for holding the commutator bars in place, as will be more particularly explained hereinafter.

Commutator cylinders are commonly made from wedge-sectioned copper bars having V-grooves in their ends, held together by V-rings or members which are more or less suitably clamped in place. Such commutator cylinders have been successfully built for over 40 years, during which time, the electrical side of commutation has been studied exhaustively, and various improvements in interpole windings and other expedients for electrically facilitating commutation have been developed; but, for a long time, the mechanical design of commutators was not disturbed because it gave no trouble that could be detected. Meanwhile, in response to public demand, dynamo-electric machines steadily increased in capacity and in their output per pound of material, meaning higher speeds and harder worked designs. A point was reached where commutator performance was no longer regarded as satisfactory.

Heretofore, the design engineers specializing on commutators have not known the actual mechanical facts about a commutator-cylinder, when operating at full speed, but such calculation and reasoning as were possible had finally led them, or most of them, to abandon the time-honored "V-bound" and "arch-bound" designs, in certain types of motors, in favor of a "drum-bound" design. In a V-bound commutator cylinder, the V-rings or clamping members wedge into the V-grooves in the commutator bars, spreading these grooves out slightly, and thus holding the bars in fixed position. In the arch-bound commutator, the commutator bars are squeezed together into as small a diameter as possible, the pressure of the V-rings being wholly exerted on the inner surfaces of the V-grooves and being counteracted by the arch binding pressure between adjacent commutator bars. In a drum-bound commutator cylinder, the bars are disposed around the periphery of a supporting drum of cylinder, so that the pressure of the V-rings is taken up by an inward pressure of each bar on this drum, rather than by an arch-bound pressure between adjacent bars.

Conditions grew worse. The same public pressure for lighter, smaller motors became particularly felt in the railway field, where the need for higher and yet higher speeds was keenly appreciated, because the output of a motor that can be put in a given space is almost directly proportional to the speed. Single-phase railway motors of the commutator type, it had been conceded for twenty years, necessarily sparked more than good direct-current motors; but this limitation was finally challenged and efforts began to be made to build single-phase commutators which would do better.

An intensive program of research on the mechanical aspects of commutator design and performance was undertaken; many trial commutators were built, and much work was done on commutators which had been previously built but had given trouble in service; an instrument was invented to measure the actual distortions of commutator cylinders at full speed, even to half a ten-thousandth of an inch; speed, load, temperature and distortion were intentionally varied and studied; there was research on the physical properties of mica and of copper, and of the effects of various shop processes and constructions.

Finally, according to the present invention, the limitations of former designs were removed by adopting a disk-spring having sufficient flexibility to follow up the permanent setting or contraction which was found to take place in the copper, and having a sufficiently uniform force all around its periphery to avoid unequal distortion of the V-rings, which would, in turn, cause high spots on the commutator cylinder.

Meanwhile, a particularly desirable disk-spring had been evolved for other purposes, which has been described in an application of Winston A. Brecht, Serial No. 293,542, filed July 18, 1928, and assigned to the Westinghouse Electric and Manufacturing Company, whereby the maximum flexibility for a given size of spring may be obtained by means of a tapered spring washer in which all of the spring material is worked substantially at its maximum limit. I prefer to use this improved spring in my disk-spring commutator although I am by no means limited to such use.

The mechanical theory of my disk-spring commutator is not known to an absolute certainty, because it involves many new ideas which have not yet been fully developed, although my new commutator itself, regardless of its theory, has been thoroughly tested and proved in service. My theory, as based on the most modern experience and experimental data, is as follows. A commutator cylinder comprises a large number of cold-worked (hard) copper bars spaced by mica strips and held by V-rings covered by mica V-ring insulation. The mica V-ring may vary in thickness, from point to point, as much as 10 mils out of a total thickness of 60 mils insofar as the thickness can be measured, to which must be added an unmeasurable variation introduced by the flowing of the bond which squeezes out of the mica under the high pressures applied to it. As far as can be ascertained, the mica "seasons" or reaches stability in 30 or 40 hours, but the commutator cylinder undergoes changes for much longer periods, (except in some of my newest designs), during which time there is believed to take place a slow yielding, or plastic flow, of copper, at points where it is overstressed.

The inward movement of the V-rings, resulting from the seasoning, or yielding, or plastic flow, of the commutator-copper, is quite variable in amount, but is something of the order of $\frac{1}{10}$ to $\frac{1}{2}$ mil for each ton of clamping pressure applied to the V-rings, provided such pressure is maintained, which was not the case in any commutator cylinder known prior to my invention. I have found that the longest bolts (and hence the springiest bolts) that could be used on a railway-motor commutator cylinder, in a bolted commutator construction, lose all of their tension if the commutator cylinder yields 0.13 mils per ton of the original pressure. Such a commutator cylinder could be retightened as often as 15 or 20 times, throughout many days of actual service, without ever becoming stable. Moreover, the local pressure of the finite number of bolt heads disturbs the delicate equilibriums that balance on a ten-thousandth of an inch. The ring-nut commutator-construction of the prior art, in which a ring-nut is drawn up against a V-ring, has an almost negligible amount of flexibility—only that due to the twisting of the V-ring—, so that stable commutator conditions, with the requisite pressure on the V-rings, could never be maintained with such a commutator construction.

I have found that, if a commutator cylinder is to be really good, it must not vary in radius as much as $\frac{1}{10}$ mil, not only from one bar to the next, but over a number of bars;— and this is very much smoother than can be obtained by means of the initial machining of the bars and V's. I have found that mechanical faults are at the root of most of the commutator trouble—which had previously been attributed to faulty electrical designs. I have found that a mechanically perfect commutator will give dark (sparkless) commutation, with long brush life and long commutator life, at loads far in excess of anything that had been practicable prior to my invention of the herein-described means for making possible the attainment of such mechanical perfection. And I have found that reason and calculation based on inadequate facts had produced the wrong commutator design; that V-bound commutators of great mechanical excellence are possible and even preferable to drum-bound commutators, because a hundredth of an inch bulging of a commutator, if uniform, is less troublesome than a fifth of a mil variation between adjacent bars. I have found that even arch-bound commutators are now feasible with my invention, as will be subsequently pointed out.

According to my invention, instead of attempting to constrain a commutator cylinder against all its own tendencies, so that it cannot expand and contract on heating and cooling, I make the parts which confine it flexible and of such design that the commutator will expand and contract without trouble. To the same end, I go to higher temperatures, and as ordinary cold-worked hard copper is strictly limited in the temperature which it will withstand without softening, I have adopted a new commutator-bar copper having a small percentage of cadmium alloyed therewith. On the other hand, the natural tendency of the copper bars to buckle, or bend sideways, by reason of the surface-strains which are introduced by the cold-working process—rolling or drawing through dies— is removed by interrupting the continuity of the side surface, as by means of holes punched through the bars, because a bending or curling of $\frac{1}{32}$ inch, or less, cannot be tolerated in the bars of a finished commutator.

By my invention, I am enabled not only to expedite the seasoning of a commutator cylinder, but also to cause it in many instances to be self-seasoning, any slight tendencies toward roughness being so small and so gradual that the grinding action of the brushes is sufficient to take care of the same.

Referring to the drawings,

Figure 1 is a longitudinal sectional view of a portion of a motor embodying my improved commutator, Fig. 2 is a plan view of a commutator bar, Fig. 3 is an end elevation thereof, Fig. 4 is a sectional view of a portion of the disk spring utilized in my invention, and Fig. 5 is a sectional view, similar to Fig. 1, showing a modification.

In Fig. 1, my improved commutator is shown applied to a single-phase railway motor having a stator member 6 and an armature member 7, the latter being connected to a commutator cylinder 8, which is mounted on a commutator spider or bushing 9, carried by the armature shaft 10. Brushes 12 bear against the commutator cylinder 8 in the usual manner. The motor is provided with a frame 14, into the top of which the ventilating air is forced, at the commutator end of the motor, as indicated by the arrow 15, the armature member being ventilated by means of air drawn through the commutator spider 9, underneath the commutator, as indicated by the arrow 16.

The commutator cylinder 8 comprises a large number of wedged-sectioned copper bars 18, which are provided with V-grooves 19 at their ends, and these bars are held in place by means of two V-rings of members 20 and 21, which are covered by mica V-rings 22. The V-member 20, in the motor illustrated in the drawings, is integral with the commutator spider 9, whereas the V-member 21 is a movable V-ring, which is mounted on the cylindrical rim member 23 of the spider, which lies underneath the commutator cylinder. The V-ring 21 is held in place by means of a heavy disk-spring or washer 24, which is dished or twisted by means of a tool applied, as indicated by dotted lines 25, prior to the assembly of the commutator spider on the armature shaft, the disk-spring being then retained in its dished or twisted position by means of a ring nut 26.

The disk-spring is preferably tapered, in cross-section, as set forth in the Brecht application hereinabove mentioned, the tapering being such that the thickness of the spring disk or washer at every point is proportional to the distance of that point from the axis of the washer. No spring can be stressed to a point at which any portion of the spring material is subjected to more than the maximum permissible stress. In the tapered disk-spring construction just described, every portion of the two sides of the spring is stressed to substantially the same degree, and, preferably, as close to the maximum permissible stress as possible, so that the maximum resiliency, or amount of deformation of the spring, is obtained for any given total spring force and for any given available space in which the spring may be placed. By this means, about twice the flexibility is obtained, as compared with a uniform-sectioned spring washer.

The functions and advantages of my disk-spring commutator construction have already been pointed out. In order to give a more definite idea of the quantitative relations involved, I have shown my commutator as being applied to 25-cycle commutator motor for railway service, having a continuous rating of 230 H. P. and 1 hour-rating of 275 H. P., operating at a maximum speed of about 10,000 feet per minute at the periphery of the commutator cylinder. The commutator cylinder is composed of 228 bars and has a diameter, at its operative surface, of 18¾ inches. The disk-spring has an outer diameter of 15½ inches, and an inner diameter of 11 inches; and its thickness is 1.328 inches at its outer periphery. It has a deflection of 95 mils at its operating pressure of 150,000 pounds, at which pressure the spring material is worked at a stress of 100,000 pounds per square inch.

In general, I should say that the deflection of the disk-spring should be at least ½ mil per ton of spring-pressure, and preferably several times the seasoning yielding of the V-rings of the commutator. The particular disk-spring just described has a flexibility of 1.3 mils per ton.

By means of the adoption of my spring-disk design, instead of the old bolted commutator construction which was previously used on the railway motor shown in Fig. 1, not only do I obtain 30 percent more area under the commutator cylinder for the passage of ventilating air, but also the new commutator construction has exactly 9½ times the flexibility of the old bolted commutator construction, while, at the same time, overcoming the other mechanical defects of the old commutator, such as non-uniform forces around the peripheries of the V-rings, and failure to season properly, as hereinabove fully explained.

In the embodiment of my invention shown in Fig. 5, what is perhaps a more universally applicable embodiment of my disk-spring commutator is shown in a design in which the ring-nut 26a is placed at the front end of the commutator rather than the rear end, although this feature is not important. It is important, however, that the retaining means, such as the ring nut 26 or the ring nut 26a, or its equivalent, for holding the inner periphery of the disk-spring in its stressed position, shall be a smooth ring member which applies, to said inner periphery of the spring, a pressure which is substantially uniform all the way around the periphery, so as to avoid the transmission of unequal pressures at different portions of the periphery of the V-ring.

The commutator bars are of hard copper. As commonly manufactured in this country, these bars are rolled hot, then drawn through a wedged-shaped die, the final reduction in area, in the drawing process, being as much as 20 or 25 percent in a single passage through the die, for the small bars; with reductions of 12 or 15 percent per pass, in the largest bars. In Europe, the more costly process of rolling the bars into the final wedged shape is employed. In either event, this cold-working of the copper hardens the same, and introduces high surface strains in the bars, which cause the bars to curl and to refuse to remain straightened. As a means for offsetting this tendency, particularly in the larger bars, I have found that any means for "breaking the back," so to speak, of this surface-tension may be employed, such as, placing dents in the sides of the commutator bars, or punching holes clear through the bars; the latter process being preferable, as it reduces the weight of the bars and saves copper.

Thus, in Fig. 5, I have shown my invention as applied, in its preferred construction, to a commutator composed of bars having a plurality of perforations indicated at 30.

My improved disk-spring commutator may be either V-bound or arch-bound. The difference between V-binding and arch-binding is not apparent from the drawings, and is determined by the process of assembling the commutator parts, particularly in the choice of the proper thickness of the mica spacers between the commutator bars. In the majority of cases, I utilize a V-bound commutator in which I believe that about 75 percent of the spring pressure is taken up in V-binding pressure, resulting in a slight opening of the V-grooves in the bars, while about 25 percent of the spring pressure is taken up in arch-pressure resulting from arch-binding between adjacent commutator bars. It is quite possible, with my invention, to utilize a 100-percent arch-bound commutator, and, although I have not yet subjected a commutator of this type to as complete tests as those to which V-bound spring-disk commutators have been subjected, I believe that I shall prefer it to the V-bound commutator, at least in many instances.

An important feature of my invention is that the great flexibility and uniform pressure of my spring disk renders the matter of thermal expansions and contractions of little moment, as distinguished from prior designs in which these expansions and contractions presented a serious problem, particularly where the ventilating air passed under the commutator spider, resulting in keeping it relatively cool. In fact, any overheating of the commutator was very apt to spoil it and necessitate regrinding, in the designs which were in vogue prior to my invention.

In my spring-disk commutator, therefore, I am enabled to tolerate higher commutator temperatures. Copper which has been cold drawn to harden the same loses its hardness at various critical temperatures, of which 110° C. may be taken as representative, depending upon the amount of reduction of the copper cross-section during the drawing or rolling process which had been used in producing the hardness.

In order to overcome this temperature-limitation of copper, which was made possible by my introduction of the spring-disk construction, I may find it practicable, in many instances, to resort to different alloys of copper which are capable of retaining their hardness at higher temperatures. For this purpose, the most suitable material seems to be cadmium copper, which consists of at least 90% copper, the rest being cadmium, and which, preferably, consists of as much as 95% to 97% copper.

As intimated hereinabove, I find the greatest applicability of my invention in a self-seasoning commutator in which the grinding action of the brushes is sufficient to maintain a smooth commutator surface during the seasoning process. My disk-spring construction is equally applicable, however, to a process of manufacture in which the commutator is more or less seasoned at the factory, with one or more re-grinding operations before it is shipped out for use.

In the usual construction of commutators, they are baked when assembled, before being placed on the armature, and again when the entire armature is baked. Moreover, the process of soldering the commutator leads to the commutator necks usually necessitates a re-grinding of the commutator. I have found that these heat treatments and this re-grinding, which are done in the ordinary course of manufacture of the commutator, are quite sufficient, in many designs of my new spring-disk commutator, and such is my preferred construction, particularly for general application in railway motors.

In such large special designs as may require further seasoning treatment before shipment of the dynamo-electric machine, my invention is also applicable, as it eliminates all, or substantially all, necessity for retightening the commutator during the seasoning process. Moreover, my spring clamping means holds up its clamping pressure on the V-rings to a substantially uniform maximum value, during the seasoning process, whereby such seasoning process is materially expedited, thereby resulting in considerable saving, because of the immense cost of pre-seasoning commutators, which amounts, sometimes, to 25% of the entire cost of the dynamo-electric machine. Moreover, whether the commutator is pre-seasoned or self-seasoning, my invention produces a more perfect mechanical construction in applying a uniform pressure in a manner which permits the V-rings to move in and out without loosening or buckling the commutator bars.

In designing commutators for dynamo-electric machines, it is customary to try to make the clamping pressure on the V-rings at least equal to the horizontal centrifugal force between the commutator bars and the 30° angle on the under sides of the V-rings, so that, when the maximum speed is reached, there will be no movement of the commutator bars. As will be understood from the foregoing discussion of the commutators of the prior art, this desirable condition of tightness of the commutator bars has not been maintained heretofore, because of the seasoning of the commutator, but it has been aimed at in the initial designs of the commutators, where clamping pressures, drawing the V-rings together, have been made as high as four to ten times the horizontal component of this centrifugal force.

In general, my invention finds its greatest applicability to commutator-designs in which the required V-ring clamping pressure is at least 40 tons, or in which the peripheral commutator speed is at least 7000 feet per minute.

I prefer, in railway-motor designs, to make my resilient clamping pressure about 1½ to 2 times the horizontal component of the centrifugal force at the maximum rated overspeed of the motor. In designing the commutator, the cross-sections of the copper must be so chosen that, at the end of the seasoning process, no section of the copper shall be overstressed to the point where plastic flow will occur. I prefer to utilize a spring capable of withstanding an initial stress somewhat higher than the desired working-stress on the V-rings, calculating the initial spring-pressure, in accordance with my best judgment as to the total amount of seasoning to be expected, so that the spring-pressure will be the proper amount, in relation to the centrifugal force, at the end of the seasoning operation.

An important advantage of my invention is the maintenance of a substantially constant commutator assembly pressure during service expansions and contractions. A copper commutator will expand 1 mil per inch between gauge points for a 70° C. temperature rise. In the particular motor hereinabove described, this would mean a variation of 40% between the maximum and minimum pressures on the V-rings, for the old bolted commutator previously mentioned, and 4% extreme variation for my spring commutator, or only 2% departure from the mean value of the pressure. In general, I prefer to keep this departure from mean within at least 5%.

In the foregoing specification, and in the claims, I have used the expression V-grooves, V-rings and the like in accordance with the usual terminology of the art, without any idea of limiting myself to any precise shape, whether it is an exact V or not. In general, I desire my specification to be construed as merely illustrating a preferred application or applications of my invention to a commutator design, rather than as limiting my invention to the precise details shown, and I desire that the language of the appended claims shall be construed in the broadest manner consistent with this specification and my improvements over the prior art.

I claim as my invention:

1. A commutator cylinder comprising a plurality of commutator bars subject to seasoning yielding and having V-grooves in their ends, two annular V-members for retaining the ends of said bars and means for drawing together said two V-members comprising a disk-spring applying a sufficient substantially uniform pressure around its periphery to cause slow yielding of the bars on seasoning and having a deflection at least commensurate with said yielding of the commutator on seasoning.

2. A commutator cylinder comprising a plurality of copper commutator bars having V-grooves in their ends, two annular V-members for retaining the ends of said bars and means for drawing together said two V-members comprising a disk-spring applying a sufficient substantially uniform pressure around its periphery to cause slow yielding of the copper on seasoning and having a deflection of several times the amount of yielding of the commutator on seasoning.

3. A commutator cylinder comprising a plurality of copper commutator bars having V-grooves in their ends, two annular V-members for retaining the ends of said bars and means for drawing together said two V-members comprising a disk-spring applying a sufficient substantially uniform pressure around its periphery to cause slow yielding of the copper on seasoning and having a deflection greater than said yielding of the commutator on seasoning, the initial setting of the disk spring being such as to produce a pressure somewhat higher than necessary to hold the commutator after seasoning, and brushes bearing on the commutator capable of grinding down any slight roughnesses as fast as they tend to develop while the commutator is seasoning itself in service.

4. A commutator cylinder comprising a plurality of copper commutator bars having V-grooves in their ends, two annular V-members for retaining the ends of said bars and means for drawing together said two V-members comprising a disk-spring applying a sufficient substantially uniform pressure around its periphery to cause slow yielding of the copper on seasoning and having a deflection greater than ½ mil per ton of spring pressure.

5. A commutator cylinder comprising a plurality of copper commutator bars having V-grooves in their ends, two annular V-members for retaining the ends of said bars and means for drawing together said two V-members comprising a disk-spring applying a sufficient substantially uniform pressure around its periphery to cause slow yielding of the copper on seasoning and having a deflection of at least something of the order of 1 mil per ton of spring pressure and having a spring pressure of at least 40 tons.

6. A commutator cylinder comprising a plurality of copper commutator bars having V-grooves in their ends, two annular V-members for retaining the ends of said bars and means for drawing together said two V-members comprising a tapered spring washer having a thickness, at any point, proportional to the radial distance of that point from the center of the washer, said washer being disposed with its outer periphery pressing against one of said V-members and means for applying a substantially continuous uniform force around the inner periphery of said spring washer.

7. A commutator cylinder comprising a plurality of copper commutator bars having V-grooves in their ends, two annular V-members for retaining the ends of said bars and means for drawing together said two V-members comprising a tapered spring washer having a thickness, at any point, proportional to the radial distance of that point from the center of the washer, said washer being disposed with its other periphery pressing against one of said V-members and a ring nut for applying a substantially continuous uniform force around the inner periphery of said spring washer.

8. A commutator cylinder comprising a plurality of commutator bars having V-grooves in their ends, two annular V-members for retaining the ends of said bars and means for drawing together said two V-members comprising a tapered spring washer having a thickness, at any point, proportional to the radial distance of that point from the center of the washer, said washer being disposed with one of its peripheries pressing against one of said V-members and means for applying a substantially continuous uniform force around the other periphery of said spring washer.

9. A commutator cylinder comprising a plurality of copper commutator bars having V-grooves in their ends, two annular V-members for retaining the ends of said bars, and means for drawing together said two V-members, characterized by the fact that said drawing-together means comprises a disk-spring applying substantially uniform pressure, around its periphery, to one of said V-members, and characterized further by the fact that said disk-spring comprises cross-sections of such shape, at every point, that substantially all portions of both sides thereof are substantially equally stressed, whereby a substantially maximum flexibility for a given force, a given space and a given strength of spring-material is obtained.

10. A commutator cylinder comprising a plurality of copper commutator bars having V-grooves in their ends, two annular V-members for retaining the ends of said bars and means for drawing together said two V-members, characterized by the fact that said drawing-together means comprises a disk-spring applying sufficient substantially uniform pressure around its periphery to cause slow yielding of the copper on seasoning and having a deflection at least commensurate with said yielding of the commutator on seasoning, and characterized further by the fact that said disk-spring has cross-sections of such shape, at every point, that substantially all portions of both sides thereof are substantially equally stressed, whereby a substantially maximum flexibility for a given force, a given space and a given strength of spring-material is obtained.

11. A commutator cylinder comprising a plurality of copper commutator bars having V-grooves in their ends, two annular V-members for retaining the ends of said bars and means for drawing together said two V-members, characterized by the fact that the drawing-together means comprises a disk-spring applying sufficient substantially uniform pressure around its periphery to cause slow yielding of the copper on seasoning and having a deflection of several times the amount of yielding of the commutator on seasoning, characterized further by the fact that said disk-spring has cross-sections of such shape, at every point, that substantially all portions of both sides thereof are substantially equally stressed, whereby a substantially maximum flexibility for a given force, a given space and a given strength of spring-material is obtained.

12. In a dynamo-electric machine, a commutator cylinder comprising a plurality of wedge-sectioned cold-worked copper commutator bars having V-grooves in their ends, with non-molded straticulate insulating spacers therebetween, two annular V-members for retaining the ends of said bars and means for drawing together said two V-members, characterized by the fact that said drawing-together means comprises a disk spring for permitting thermal expansions and contractions of the copper without loosening of the commutator bars, and characterized further by having means for interrupting the continuities of the lateral surfaces of the bars, whereby deformation and dislodgement of the bars during service is substantially prevented.

13. In a dynamo-electric machine, a commutator cylinder comprising a plurality of wedge-sectioned cold-worked copper commutator bars and mica spacers having V-grooves in their ends, two annular V-members for retaining the ends of said bars and means for drawing together said two V-members, characterized by the fact that said drawing-together means comprises a disk spring for permitting thermal expansions and contractions of the copper without loosening of the commutator bars, and characterized further by having at least one perforation through each bar for interrupting the continuities of the lateral surfaces of the bars, whereby deformation and dislodgement of the bars during service is substantially prevented.

14. In a dynamo-electric machine, a commutator cylinder, particularly adapted for service with peripheral commutator speeds of at least 7000 feet per minute, and comprising a plurality of copper commutator bars having V-grooves in their ends, two annular V-members for retaining the ends of said bars and means for drawing together said two V-members, characterized by the fact that said drawing-together means for the V-members comprises a disk-spring applying substantially uniform pressure, around its periphery, to one of said V-members, said disk-spring having a deflection of at least several times the maximum range of expansions and contractions of the copper resulting from variations in load and having a spring pressure sufficient to hold said bars in place at the operating speed thereof.

15. In a dynamo-electric machine, a commutator cylinder, particularly adapted for service with peripheral commutator speeds of at least 7000 feet per minute, and comprising a plurality of hard copper commutator bars having V-grooves in their ends, two annular V-members for retaining the ends of said bars and means for drawing together said two V-members, characterized by the fact that said commutator bars are made from a copper metal capable of withstanding temperatures higher than 110° C. without losing its hardness, and characterized further by the fact that said drawing-together means for the V-members comprises a disk spring applying substantially uniform pressure, around its periphery, to one of said V-members, said disk-spring having a deflection of at least several times the maximum range of expansions and contractions of the copper resulting from variations in load and having a spring pressure sufficient to hold said bars in place at the operating speed thereof.

16. In a dynamo-electric machine, a commutator cylinder, particularly adapted for service with peripheral commutator speeds of at least 7000 feet per minute, and comprising a plurality of hard copper commutator bars having V-grooves in their ends, two annular V-members for retaining the ends of said bars and means for drawing together said two V-members, characterized by the fact that said commutator bars are made from a metal consisting of at least 90 percent copper and substantially all of the remainder thereof cadmium, and characterized further by the fact that said drawing-together means for the V-members comprises a disk spring applying substantially uniform pressure, around its periphery, to one of said V-members, said disk-spring having a deflection of at least several times the maximum range of expansions and contractions of the copper resulting from variations in load and having a spring pressure sufficient to hold said bars in place at the operating speed thereof.

17. In a dynamo-electric machine, a commutator cylinder comprising a plurality of copper commutator bars having V-grooves in their ends, two annular V-members for retaining the ends of said bars and means for drawing together said two V-members, characterized by the fact that said commutator bars are made from a metal consisting of at least 90% copper and substantially all of the remainder thereof cadmium, and characterized further by the fact that said drawing-together means for the V-members comprises a disk spring applying substantially uniform pressure, around its periphery, to one of said V-members, said disk-spring having a deflection of at least several times the maximum range of expansions and contractions of the copper resulting from variations in load.

18. In a dynamo-electric machine, a commutator cylinder comprising a plurality of copper commutator bars having V-grooves in their ends, two annular V-members for retaining the ends of said bars and means for drawing together said two V-members, characterized by the fact that said commutator bars are made from a metal consisting of at least 90% copper and substantially all of the remainder thereof cadmium.

19. In a dynamo-electric machine, a commutator cylinder comprising a plurality of copper commutator bars having V-grooves in their ends, two annular V-members for retaining the ends of said bars and means for drawing together said two V-members, characterized by the fact that said commutator bars are made from a metal consisting of from about 95% to about 97% copper and substantially all of the remainder thereof cadmium.

20. In a dynamo-electric machine, a commutator cylinder comprising a plurality of copper commutator bars having V-grooves in their ends, two annular V-members for retaining the ends of said bars and means for drawing together said two V-members, characterized by the fact that said commutator bars are made from a copper alloy having at least 2% of cadmium therein.

21. In a dynamo-electric machine, a commutator cylinder comprising a plurality of copper commutator bars having V-grooves in their ends, two annular V-members for retaining the ends of said bars and means for drawing together said two V-members comprising resilient means for maintaining a commutator assembly pressure constant within 5 per cent of the average pressure during thermal expansions and contractions in service, the total assembly pressure being at least of the order of 40 tons, and the pressure being substantially uniform around the circumference.

22. A commutator cylinder comprising a plurality of commutator bars subject to seasoning yielding and having V-grooves in their ends, two annular V-members for retaining the ends of said bars and means for drawing together said two V-members comprising spring means for applying a sufficient substantially uniform pressure around its periphery to cause slow yielding of the bars on seasoning and having a deflection at least commensurate with said yielding of the commutator on seasoning.

23. A commutator cylinder comprising a plurality of copper commutator bars having V-grooves in their ends, two annular V-members for retaining the ends of said bars and means for drawing together said two V-members comprising spring means applying a sufficient substantially uniform pressure around its periphery to cause slow yielding of the copper on seasoning and having a deflection of several times the amount of yielding of the commutator on seasoning.

24. A commutator cylinder comprising a plurality of copper commutator bars having V-grooves in their ends, two annular V-members for retaining the ends of said bars and means for drawing together said two V-members comprising spring means for applying a sufficient substantially uniform pressure around its periphery to cause slow yielding of the copper on seasoning and having a deflection greater than said yielding of the commutator on seasoning, the initial setting of the spring means being such as to produce a pressure somewhat higher than necessary to hold the commutator after seasoning, and brushes bearing on the commutator capable of grinding down any slight roughnesses as fast as they tend to develop while the commutator is seasoning itself in service.

25. A commutator cylinder comprising a plurality of copper commutator bars having V-grooves in their ends, two annular V-members for retaining the ends of said bars and means for drawing together said two V-members comprising spring means for applying a sufficient substantially uniform pressure around its periphery to cause slow yielding of the copper on seasoning and having a deflection greater than ½ mil per ton of spring pressure.

26. A commutator cylinder comprising a plurality of copper commutator bars having V-grooves in their ends, two annular V-members for retaining the ends of said bars and means for drawing together said two V-members comprising spring means for applying a sufficient substantially uniform pressure around its periphery to cause slow yielding of the copper on seasoning and having a deflection of at least something of the order of 1 mil per ton of spring pressure and having a spring pressure of at least 40 tons.

27. A commutator cylinder comprising a plurality of copper commutator bars having V-grooves in their ends, two annular V-members for retaining the ends of said bars and spring means for drawing together said two V-members comprising a washer having its outer periphery pressing against one of said V-members with a pressure which is substantially uniform spacially at all points around the commutator cylinder and also substantially uniform in time throughout normal thermal expansions and contractions in service, the total pressure of the spring means being at least of the order of 1,640 pounds per lineal inch of the outer periphery where the washer bears against the V-member.

28. In a dynamo-electric machine, a commutator cylinder comprising a plurality of wedge-sectioned cold-worked copper commutator bars having V-grooves in their ends, two annular V-members for retaining the ends of said bars and means for drawing together said two V-members with a pressure at least of the order of 1,640 pounds per lineal inch of the circumference where it is applied to the V-members, characterized by the fact that said drawing-together means comprises means for permitting thermal expansions and contractions of the copper without loosening of the commutator bars, said means applying yieldable pressure in such manner that the pressures applied to all of the commutator bars are substantially the same at all points around the commutator cylinder.

In testimony whereof, I have hereunto subscribed my name this 6th day of August 1929.

GEORGE A. MOORE.